(12) United States Patent
Srikanth et al.

(10) Patent No.: US 6,430,621 B1
(45) Date of Patent: Aug. 6, 2002

(54) SYSTEM USING DIFFERENT TAG PROTOCOL IDENTIFIERS TO DISTINGUISH BETWEEN MULTIPLE VIRTUAL LOCAL AREA NETWORKS

(75) Inventors: Ayikudy K. Srikanth, Reading; Rahul A. Mehta, Woburn, both of MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/222,045

(22) Filed: Dec. 29, 1998

(51) Int. Cl.[7] .............................................. G06F 15/173
(52) U.S. Cl. ........................ 709/238; 709/227; 709/230; 709/245
(58) Field of Search ................................. 370/466, 392, 370/389, 393; 709/227, 230, 238, 245

(56) References Cited

U.S. PATENT DOCUMENTS

| 5,394,402 A | | 2/1995 | Ross | |
|---|---|---|---|---|
| 6,181,699 B1 | * | 1/2001 | Crinion et al. | 370/392 |
| 6,252,888 B1 | * | 6/2001 | Fite, Jr. et al. | 370/466 |

OTHER PUBLICATIONS

Varadarajan, "Virtual Local Area Networks", Aug. 14, 1997, pp. 1–12.*
Feltman C: "A Reality Check on Virtual Lans" Business Communications Review, US, Hinsdale, IL, Jul. 1996, pp. 27–31, XP000669937.
"Virtual Lans Get Real Tthernet Switch Makers Are Taking the Lead in Deploying Virtual Lans Across Camput Networks" Data Communications, US, McGraw Hill, New York, vol. 24 No. 3, Mar. 1, 1995, pp. 87–92, 94, 96, X000496027.

* cited by examiner

Primary Examiner—Le Hien Luu
(74) Attorney, Agent, or Firm—Blakely Sokoloff Taylor & Zafman LLP

(57) ABSTRACT

A method and apparatus that provides for grouping nodes in multiple VLANs using port based VLAN grouping, and explicitly associates one of multiple VLANs with a packet transmitted by the nodes, using IEEE 802.1Q based frame tagging. A switch receives an untagged packet, filters the packet, and based on the contents of the packet, inserts a tag header with a common VLAN identifier and a unique tag protocol identifier (TPID).

18 Claims, 3 Drawing Sheets

SYSTEM USING DIFFERENT TAG PROTOCOL IDENTIFIERS TO DISTINGUISH BETWEEN MULTIPLE VIRTUAL LOCAL AREA NETWORKS

BACKGROUND OF THE INVENTION

1. Field of the Invention

The present invention is related to data communications in a Local Area Network (LAN). In particular, the present invention is related to providing multiple virtual LANs (VLANs) per switch port in a port-based VLAN implementation.

2. Description of the Related Art

Virtual Local Area Networks (Virtual LANs or VLANs) are logical groupings of nodes in a Media Access Control (MAC) bridged, or switched, network. In other words, VLANs define groups of nodes in the switched network that are not constrained by the physical location of the nodes. VLANs provide for increased user and network security: only nodes belonging to a particular VLAN communicate as if they shared a common LAN. Given the shift toward high speed LAN switching at the MAC layer as an alternative to data packet routing at the Network layer, VLANs provide an International Standards Organization (ISO) Open Systems Interconnection (OSI) Layer 2 based alternative to Layer 3 based methods for decreasing, containing, or limiting broadcast and multicast traffic in a network that is compatible with a switched LAN architecture.

The Institute for Electrical and Electronic Engineers (IEEE) is presently drafting a standard (802.1Q) that covers the operation of IEEE 802.1D MAC bridges or switches in a VLAN environment. However, there remain a number of proprietary, vendor-specific VLAN implementations for defining VLAN membership, and controlling intra- and inter-VLAN communication between nodes.

There are a number of well known, generally accepted ways for defining VLAN membership, i.e., for defining which nodes in a network belong to the same VLAN, and hence, which nodes can communicate with each other. As is well known to those of ordinary skill in the art, VLAN membership may be based on MAC-layer address, Network layer protocol type, Network layer address, or multicast address. One of the more common prior art methods for defining VLAN membership is based on the grouping of ports on a LAN switch. For example, nodes connected to ports 1, 2, 3, 5 and 8 of a switch may be grouped in VLAN 1, while nodes attached to ports 4, 6 and 7 of the same switch may be grouped in VLAN 2. Grouping nodes into a particular VLAN based on switch ports is applicable across multiple switches in a switched LAN architecture. With reference to FIG. 1, for example, nodes attached to ports 1, 2, 3, 5 and 8 of switch 1 and port 8 of switch 2 are grouped in VLAN 1. Additionally, nodes attached to ports 4 and 6 of switch 1 and ports 1, 3, 5 and 6 of switch 2 are grouped in VLAN 2. Finally, nodes attached to port 7 of switch 1 and ports 2, 4 and 7 of switch 2 belong to VLAN 3. Note that in a port-based VLAN grouping, a node cannot belong to multiple VLANs, since the node is attached to a switch via a single port. However, there are instances in which it is desirable for a node in a network, e.g., a sever or a high speed networked printer, to be a member of more than one VLAN. What is needed, therefore, is a method for allowing such a node to be granted membership in multiple VLANs.

Given a method for allowing a node to be granted membership in multiple VLANs, VLAN capable LAN switches must convey VLAN membership information associated with a particular node when forwarding a data packet for the node from switch to switch. Depending on the method of defining VLAN membership groups, e.g., Network layer protocol based grouping, the VLAN membership information is implicitly defined in the data packet forwarded by the switch. In other instances, such as port based VLAN membership grouping, an explicit reference must be inserted in the data packet before it is forwarded from a switch to the destination node, or another switch, so that the VLAN in which the data packet is allowed to be transmitted can be determined. A common prior art method for transmitting VLAN information between switches is based on frame tagging. Frame tagging involves inserting a header, comprising a VLAN identifier (VID) into a frame, or packet, prior to forwarding the packet over an interswitch link, so that the receiving switch can identify the VLAN to which the particular packet belongs.

A proposed method for identifying the VLAN to which a particular packet belongs, based on the frame tagging paradigm, is set forth in the IEEE draft standard 802.1Q. The draft standard suggests a standard format and definition of a single VLAN identifier (VID) in a tag header. In a port based VLAN grouping approach, in which a node is assigned to a VLAN based on the port of a switch to which it is attached, inserting a tag with a single VID does not allow a node to send packets over different VLANs. That is, a node necessarily can only be a member of a particular VLAN, as fixed by the VID associated with the port on the switch to which the node is attached. What is needed, therefore, if a node is to be granted membership in multiple VLANs, is a method and apparatus for identifying the VLAN to which the node belongs, so that a packet exchanged with the node may be identified with a particular one of multiple VLANs.

BRIEF SUMMARY OF THE INVENTION

According to the present invention, a method and apparatus is provided for grouping a node in multiple VLANs using a port based VLAN grouping paradigm. The invention relates to a unique frame tagging approach for explicit VLAN identification, wherein a packet transmitted by a node is explicitly associated one of multiple VLANs by way of the tag protocol identifer/virtual LAN identifier combination in the tag header inserted in the packet.

BRIEF SUMMARY OF THE SEVERAL VIEWS OF THE DRAWINGS

The present invention is illustrated by way of example and not limitation in the following figures, in which.

DETAILED DESCRIPTION OF THE INVENTION

Described is a method and apparatus providing for grouping nodes in multiple VLANs using port based VLAN grouping, and explicitly associating one of multiple VLANs with a packet transmitted by the nodes, using frame tagging.

In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention. For example, specific details are not provided as to whether the method is implemented in a switch as a software routine, hardware circuit, firmware, or a combination thereof Embodiments of the invention may be represented as a software product stored on a machine-readable medium (also referred to as a computer-readable medium or a processor-readable medium). The machine-readable medium may be any type of magnetic, optical, or electrical storage medium including a diskette, CD-ROM, memory device (volatile or non-volatile), or similar storage mechanism. The machine-readable medium may contain various sets of instructions, code sequences, configuration information, or other data. For example, the procedures described herein can be stored on the machine-readable medium. Those of ordinary skill in the art will appreciate that other instructions and operations necessary to implement the described invention may also be stored on the machine-readable medium.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, tolltandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Figure 2A:
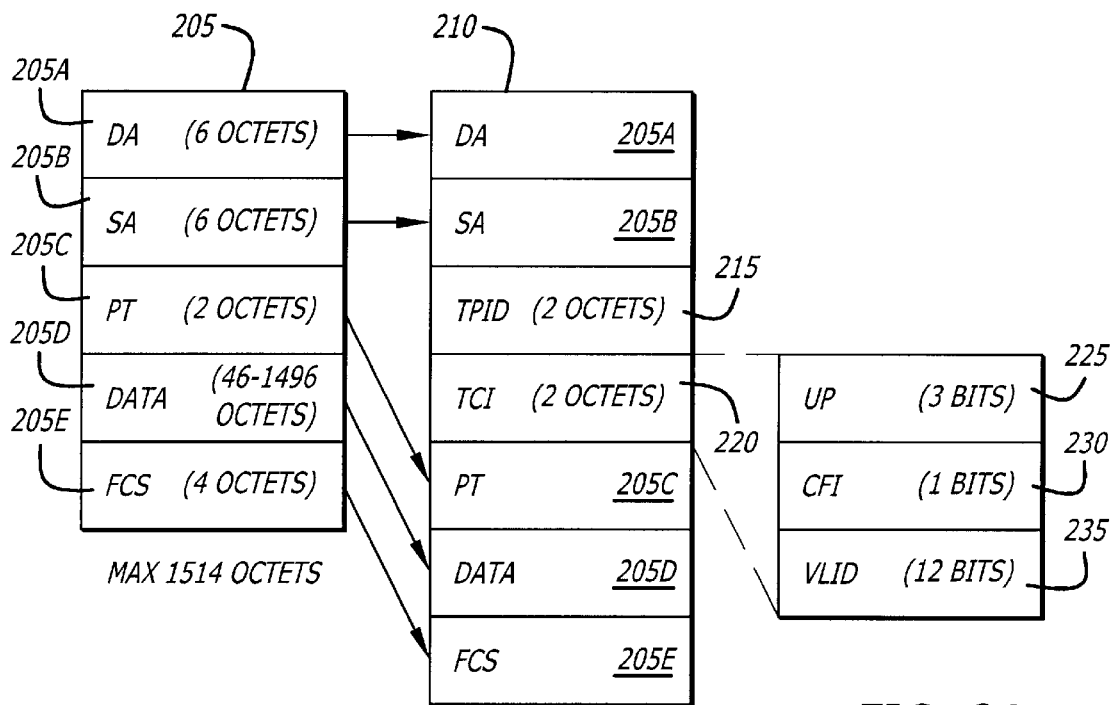
FIG. 2 illustrates the packet format for untagged and VLAN tagged Ethernet/IEEE 802.3 MAC packets.
Figure 2B:
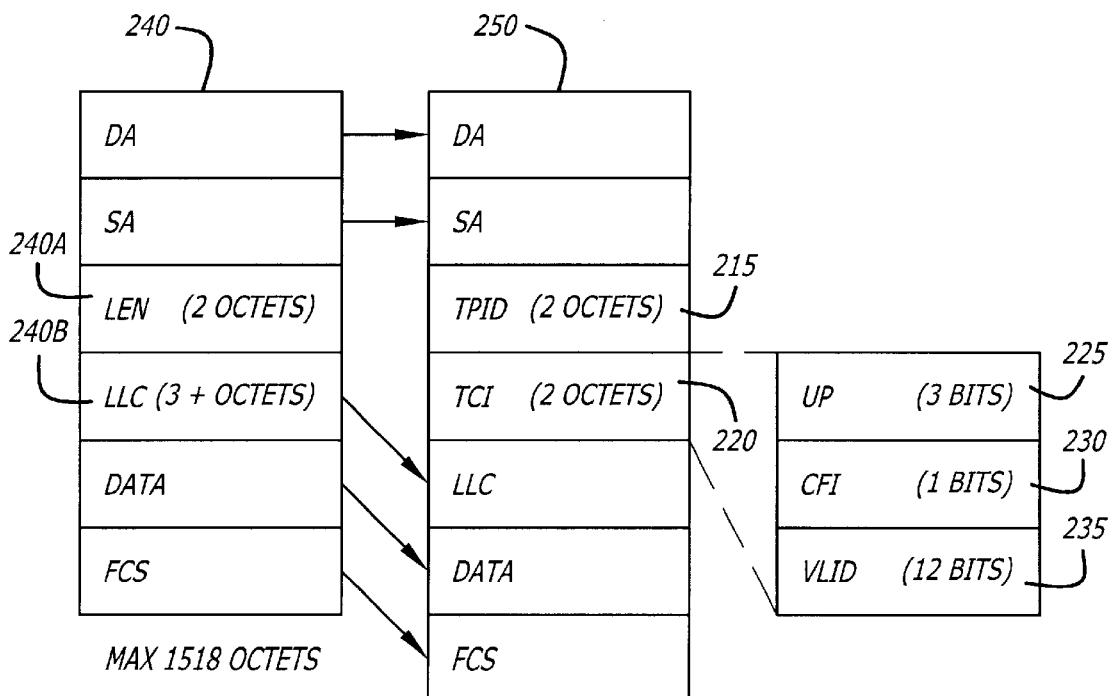

In general, tagging a frame, or packet, allows a packet to carry a virtual LAN identifier (VID). Typically, the tag is inserted in the MAC layer header of the packet, thereby providing support for VLANs across multiple MAC types. The IEEE 801.2Q committee's work in progress suggests the tag header be inserted immediately following the destination and source MAC address fields of a packet to be transmitted. FIGS. 2A and 2B provide diagrams of the respective Ethernet and IEEE 802.2 LLC packet formats for a data packet having inserted therein a tag header for associating the packet with a particular VLAN. At 205, an Ethernet packet format, prior to insertion of the VLAN header, is illustrated. The MAC destination and source addresses, at 205A and 205B, are followed by the Ethernet, or Protocol type field 205C. The data payload and frame check sequence (FCS) follow, at 205D and 205E, respectively. The tagged frame, or packet, is shown at 210. The VLAN tag, comprising a 2-octet tag protocol identifier (TPID) field 215 and 2-octet tag control information (TCI) field 220, is inserted between the Ethernet type field 205C and data payload field 205D.

The TPID field contains a protocol type that identifies the packet as an 802.1Q tagged frame. Values for the TPID field have not yet been specified by the IEEE. Vendors, therefore, generally supply a proprietary value for the field. The TCI field, in turn, comprises a user priority (UP) field 225 (3 bits), a Canonical Format Indicator (CFI) field 230, (1 bit) and a VLAN identifier (VID) field 235 (12 bits). The user priority field is used and interpreted as defined in the IEEE standard 801.2p. The CFI field indicates whether a routing information field is present in the tag header, and whether the MAC address information is in canonical or non-canonical format. The VID field carries a value that uniquely identifies the VLAN to which the packet belongs. The IEEE 802.2 LLC frame format illustrated at 240 in FIG. 2B is likewise modified to support VLAN tagging in accordance with IEEE draft standard 802.1Q, wherein the TPID and TCI fields are inserted between the 802.2 length field 240A and the LLC information field 240B.

Figure 1:
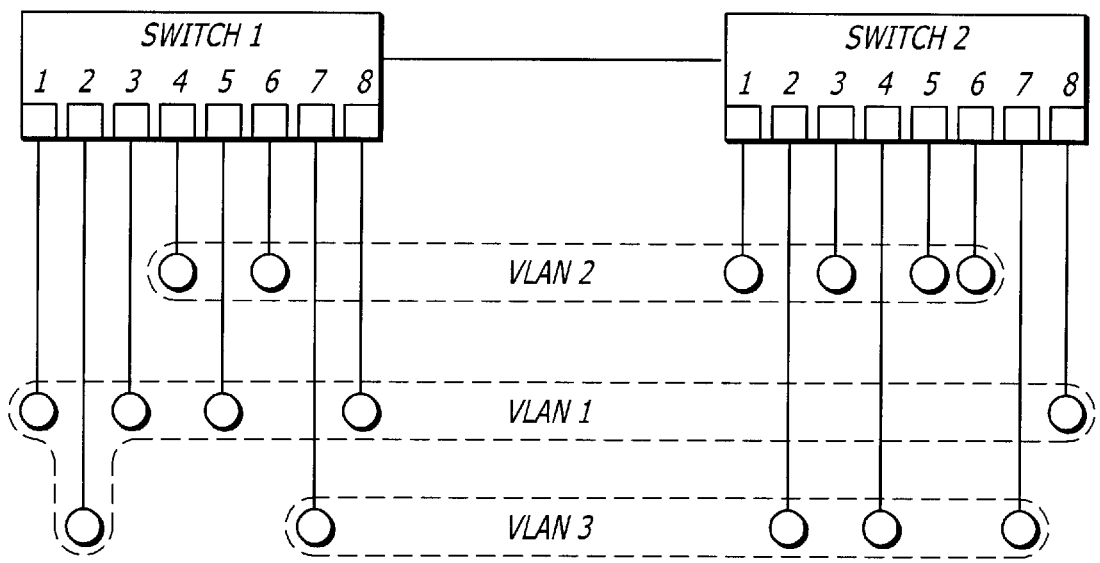
FIG. 1 is a diagram illustrating a prior art system for grouping nodes into a VLAN based on the port of a LAN switch to which the nodes are attached.
Figure 3:
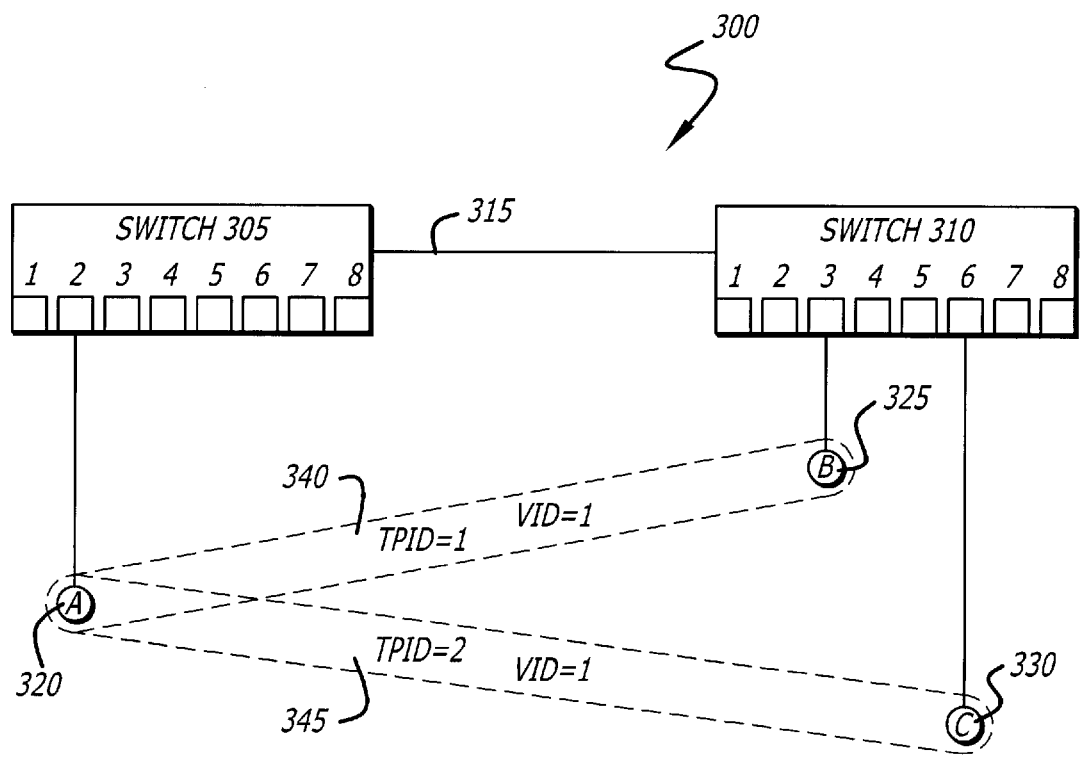
FIG. 3 illustrates an embodiment of the present invention that implements multiple VLANs per switch port using IEEE 802.1Q based VLAN tagging.
Figure 4:
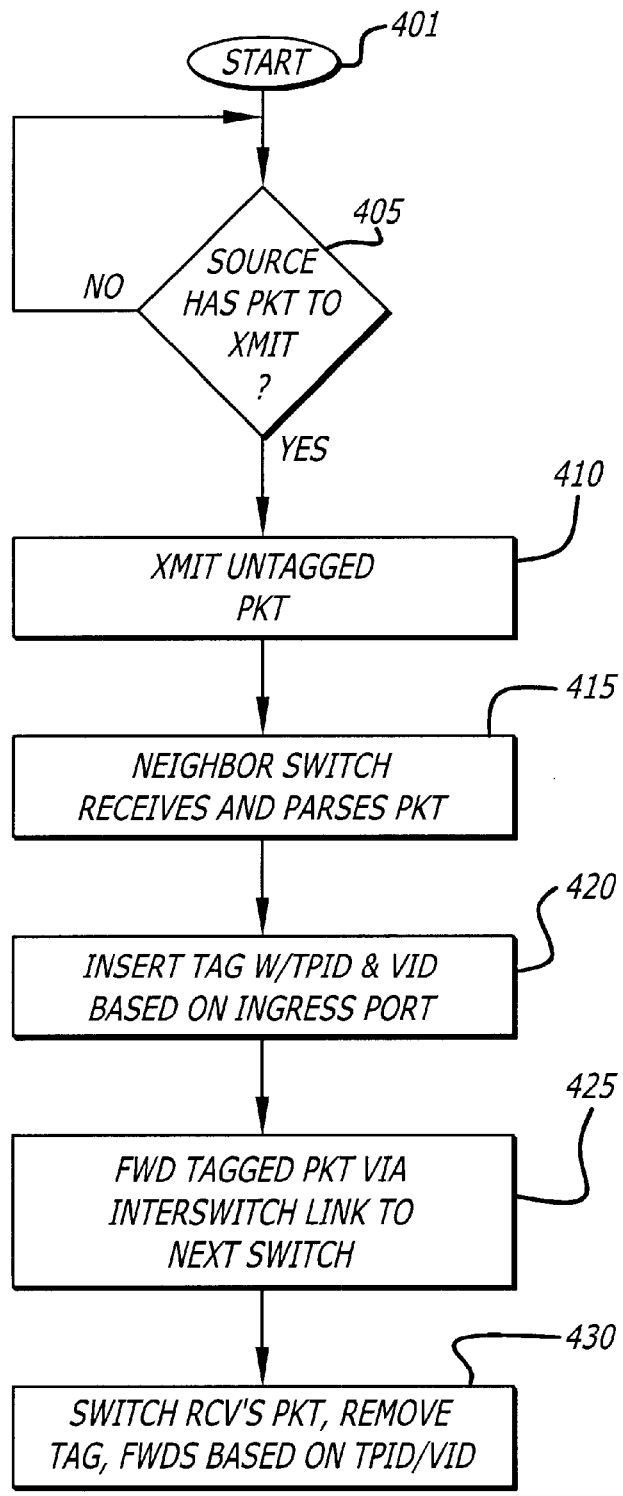
FIG. 4 is a flow chart of an embodiment of the present invention.

With reference to FIGS. 3 and 4, an embodiment of the present invention is disclosed in which a node is able to communicate with other nodes in an internet over multiple VLANs. FIG. 3 illustrates a simple internet 300 with two switches 305 and 310 interconnected by an internet backbone 315. Each switch has a number of ports each available for connecting to a node over a dedicated communications link, or multiple nodes via a shared communications link. In the internet, node A (320) is connected to switch 305 via port 2, while nodes B (325) and C (330) are respectively connected to ports 3 and 6 of switch 310. The internet 300 supports VLANs, and implements the VLANs using a port-based VLAN paradigm. For example, switch 305, port 2, and switch 310, ports 3 and 6, are configured to belong to VLAN 1 (VID=1). The port-based VLAN paradigm does not provide for multiple VLANs per port. Thus, traffic received at a particular port must be distinguished on some other basis to support multiple VLANs, that is, to forward the received packet to one of potentially multiple separate VLANs. The present invention accomplishes this through associating one of multiple unique TPID values with the received packet, as discussed below.

The process starts at 401, and waits for a node in a VLAN to transmit a packet. At 405, for example, the process waits until a source node, e.g., node A, has a packet to transmit to a destination node, e.g., node B. At 410, source node A transmits the packet. No VLAN tag information is present in a packet transmitted from a source node. At 415, the packet is received at switch 305, port 2. Port 2 is configured as a member of VLAN 1. Thus, a VLAN tag header is inserted in the packet with a VID=1. Since VLAN grouping is implemented in the switches of internet 300 according to a port-based VLAN grouping paradigm, only a single VID value (e.g., VID=1) is allowed to be associated with any packet received at a particular port. Thus, an embodiment of the present invention utilizes different TPIDs to distinguish between VLANs. The switch 305 parses the received packet using well known filtering techniques, and based on the contents of the packet, inserts a unique TPID value (e.g., TPID=1) in the tag header at 420. The filtering mechanism may consider part or all of the MAC, Network, Transport layers, either alone or in combination, in determining the TPID value to associate with the received packet. Just as examples, a unique TPID value may be assigned, i.e., inserted into, the received packet based on Network layer protocol type, MAC address, Network layer address (e.g., destination IP or multicast IP address), or Transport layer session information (i.e., a combination of source and destination Network layer addresses and Transport layer port numbers). At 425, the tagged packet is forwarded out all ports that are configured to be in the VLAN, including the local ports, i.e., ports in switch 305, as well as ports in switch 310, which receive the tagged packet via the interswitch link to switch 310. In the example internet illustrated in FIG. 3, switch 310 receives the tagged packet via the interswitch link, parses the tagged packet, determines the TPID and VID values, strips the tag and forwards the packet to the appropriate port via which the destination node is reachable, e.g., port 3, at step 430. Switch 310, as well as all switches in the internet, maintains a cache or data structure that associates particular ports with particular TPID and VID values. It is based on the information maintained in these tables that a switch forwards the packet to the appropriate port for transmission to the destination node.

In another example, a packet destined for node C is transmitted by node A and received at switch 305, port 2. Given that port 2 is configured to be associated with VLAN 1 in this example, a VLAN tag header is inserted in the packet with a VID=1. The switch again parses this packet using well known filtering techniques, and based on the contents of the packet, inserts a TPID value of 2 in the TPID field in the tag header at 420. At 425, the tagged packet is forwarded over the interswitch link to switch 310. In the same manner as set forth above, switch 310 receives the tagged packet, determines the TPID and VID values, and forwards the packet, stripped of the tag, to port 6 at step 430. Thus, packets sourced from the same node, e.g., node A, and received at the same port of switch 305, e.g., port 2, which is assigned to a single VLAN (VID=1), may nevertheless be transmitted to nodes in separate VLANs, as distinguished by a different, unique, TPID value present in the TPID field.

What is claimed is:

1. In an internet having multiple virtual local area networks (VLANs) that are defined according to a port-based VLAN grouping scheme, a method providing for a node in the internet to communicate data over the multiple VLANs, comprising:

receiving at an ingress port of a switch a packet transmitted from the node coupled to the ingress port;

inserting a VLAN tag header in the packet to create a tagged packet, the VLAN tag header comprising a tag protocol identifier (TPID) field having a TPID value and a VLAN identifier (VID) field having a VID value identifying a first VLAN with which the ingress port is associated, the TPID value being used to identify a second VLAN; and forwarding the tagged packet to an egress port of the switch for routing to a destination node associated with the second VLAN.

2. The method of claim 1, wherein the TPID value in the TPID field of the VLAN tag header inserted in the packet is determined by the contents of the packet upon receiving the packet at the ingress port.

3. The method of claim 2, wherein the TPID value in the TPID field of the VLAN tag header inserted in the packet is determined by the contents of a protocol type field in the packet upon receiving the packet at the ingress port.

4. The method of claim 2, wherein the TPID value in the TPID field of the VLAN tag header inserted in the packet is determined by the contents of a Media Access Control (MAC) address field in the packet upon receiving the packet at the ingress port.

5. The method of claim 4, wherein the TPID value in the TPID field of the VLAN tag header inserted in the packet is determined by the contents of a destination MAC address field in the packet upon receiving the packet at the ingress port.

6. The method of claim 2, wherein the TPID value in the TPID field of the VLAN tag header inserted in the packet is determined by the contents of a Network layer address field in the packet upon receiving the packet at the ingress port.

7. In an internet having multiple virtual local area networks (VLANs) that are defined according to a port-based VLAN grouping method, a method providing for a node in the internet to communicate data over multiple VLANs, comprising:

receiving at an ingress port of a switch a first packet transmitted from the node coupled to the ingress port;

inserting a VLAN tag header in the packet to create a first tagged packet, the VLAN tag header comprising a tag protocol identifier (TPID) field having a first TPID value and a VLAN identifier (VID) field having a first VID value identifying the VLAN with which the ingress port is associated;

forwarding the tagged packet to an egress port of the switch that is associated with the first TPID value and the VLAN identified by the first VID value;

receiving at the ingress port of the switch a second packet transmitted from the node coupled to the ingress port;

inserting a VLAN tag header in the packet to create a second tagged packet, the VLAN tag header comprising a tag protocol identifier (TPID) field having a second TPID value and a VLAN identifier (VID) field having a second VID value identifying a VLAN with which the ingress port is associated, the second TPID value capable of being used to identify a second VLAN; and forwarding the tagged packet to an egress port of the switch that is associated with the second TPID value and the second VID value for routing to a destination node associated with the second VLAN.

8. The method of claim 7, wherein the first TPID value in the TPID field of the VLAN tag header inserted in the packet is determined by the contents of the first packet upon receiving the first packet at the ingress port and the second TPID value in the TPID field of the VLAN tag header inserted in the second packet is determined by the contents of the second packet upon receiving the second packet at the ingress port.

9. A software product stored on a machine-readable medium, for execution on a first switch connected to an internetwork having multiple virtual local area networks (VLANs) that are defined according to a port-based VLAN grouping scheme, comprising:

a first software routine to receive at an ingress port of a first switch a packet transmitted from a node coupled to the ingress port and to insert a VLAN tag header in the packet to create a tagged packet, the VLAN tag header comprising a tag protocol identifier (TPID) field having a unique TPID value identifying one of the VLANs with which an egress port chosen to receive the tagged packet is associated and a VLAN identifier (VID) field having a VID value identifying one of the VLAN with which the ingress port is associated; and a second software routine to forward the tagged packet to the egress port of a switch that is associated with the TPID value and the VID value.

10. The software product of claim 9, further comprising a third software routine to determine the contents of the packet upon receiving the packet at the ingress port including the VLAN tag header.

11. The software product of claim 9 being executed within the first switch for forwarding the tagged packet to the switch, differing from the first switch, that is associated with the TPID value and the VID value.

12. A system comprising:

a first switch including a plurality of ports; and a second switch including a port to receive a packet, to insert a virtual local area network (VLAN) tag header in the packet for creating a tagged packet, the VLAN tag header including (i) a VLAN identifier (VID) field having a VID value identifying a first VLAN with which the port is associated and (ii) a tag protocol identifier (TPID) field having a TPID value identifying a second VLAN with which one of the plurality of ports of the first switch chosen to receive the tagged packet is associated, the second switch to further forward the tagged packet to the chosen port of the first switch.

13. The system of claim 12, wherein the second switch is in communication with the first switch over an Internet backbone, the Internet backbone enabling transmission of the tagged packet from the second switch to the first switch.

14. The system of claim 13 further comprising a node coupled to the port of the second switch.

15. The system of claim 12, wherein the TPID value is uniquely associated with one of multiple VLANs, inclusive of the first VLAN and second VLAN, associated with the system.

16. The system of claim 12, wherein the second switch includes storage to maintain TPID values and corresponding VID values for each of the plurality of ports of the first switch.

17. The system of claim 16, wherein the storage of the second switch further maintains TPID values and corresponding VID values for all ports of the second switch.

18. The system of claim 16, wherein the storage includes a cache.

* * * * *